(12) United States Patent
Chuang

(10) Patent No.: US 6,630,089 B2
(45) Date of Patent: Oct. 7, 2003

(54) PROCESS FOR FORMING A MOLDED PLASTIC LAYER ON A METAL PLATE

(76) Inventor: Chao-Yueh Chuang, No. 106, Lane 61, Ta-Fu Rd., Shen-Kang Hsiang, Taichung Hsien (TW)

( * ) Notice: Subject to any disclaimer, the term of this patent is extended or adjusted under 35 U.S.C. 154(b) by 250 days.

(21) Appl. No.: 09/861,364

(22) Filed: May 18, 2001

(65) Prior Publication Data

US 2002/0171169 A1 Nov. 21, 2002

(51) Int. Cl.⁷ ............................................. B29C 45/14
(52) U.S. Cl. ...................... 264/247; 264/250; 264/254; 264/273; 264/275; 264/279.1; 425/117; 425/121
(58) Field of Search ................................ 264/247, 254, 264/250, 273, 275, 279.1, 272.15; 425/117, 121

(56) References Cited

U.S. PATENT DOCUMENTS

| | | | | |
|---|---|---|---|---|
| 3,044,127 A | * | 7/1962 | Alden | 18/54 |
| 3,953,932 A | * | 5/1976 | Graves | 40/27.5 |
| 3,983,646 A | | 10/1976 | Howard | 40/27.5 |
| 4,435,911 A | | 3/1984 | Jones | 40/27.5 |
| 4,448,741 A | * | 5/1984 | Schad | 264/251 |
| 4,827,640 A | | 5/1989 | Jones | 40/27.5 |
| 5,075,066 A | * | 12/1991 | Terada et al. | 264/247 |
| 5,166,502 A | | 11/1992 | Rendleman et al. | 235/492 |
| 5,673,503 A | | 10/1997 | Rendleman | 40/27.5 |
| 6,296,190 B1 | | 10/2001 | Rendleman | 235/492 |

* cited by examiner

Primary Examiner—Edmund H. Lee
(74) Attorney, Agent, or Firm—Darby & Darby

(57) ABSTRACT

A process for forming a molded plastic layer on a metal plate includes the steps of forming a plurality of posts that extend through and that are bonded to the metal plate in a first mold, placing the metal plate with the posts in a mold cavity of a second mold such that the posts abut against inner wall of the second mold and such that the metal plate partitions the second mold cavity into upper and lower mold sub-cavities, and introducing a resin into the upper and lower mold sub-cavities to form the molded plastic layer which encloses the metal plate.

5 Claims, 6 Drawing Sheets

PROCESS FOR FORMING A MOLDED PLASTIC LAYER ON A METAL PLATE

BACKGROUND OF THE INVENTION

1. Field of the Invention

This invention relates to a process for forming a molded plastic layer on a metal plate.

2. Description of the Related Art

For various purposes, molded articles may include a patterned molded plastic layer and a metal piece that is enclosed in the molded plastic layer. In order to form the molded plastic layer on the metal piece, there is a need to support the metal piece in the mold so that the metal piece separates the mold cavity into two sub-cavities at two opposite sides of the metal piece such that subsequent introduction of a resin in the mold permits the formation of the molded plastic layer. However, undesirable holes formed in the molded plastic layer due to the presence of the supporting means which supports the metal piece in the mold. Moreover, when a pattern is to be formed on the molded plastic layer, the holes will undesirably limit the flexibility of the pattern design.

SUMMARY OF THE INVENTION

Therefore, the object of the present invention is to provide a process for forming a molded plastic layer on a metal plate that is capable of overcoming the aforementioned drawbacks.

According to the present invention, there is provided a process for forming a molded plastic layer on a metal plate. The process comprises the steps of: preparing a first mold that confines therein a first mold cavity and that has first upper and first lower mold halves which have first upper and first lower inner walls defining the first mold cavity, the first upper and first lower inner walls being formed with a plurality of pairs of complementary upper and lower post forming grooves and a plurality of pairs of complementary upper and lower positioning protrusions that project into the first mold cavity; forming a plurality of post forming holes and a plurality of positioning holes in the metal plate; placing the metal plate in the first mold cavity such that each pair of the complementary upper and lower positioning protrusions extend into a respective one of the positioning holes and such that each pair of the complementary upper and lower post forming grooves are vertically registered with and cooperate with a respective one of the post forming holes to define a post forming cavity; introducing a first resin into the post forming cavities to form a plurality of supporting posts that respectively extend through the post forming holes and that are bonded to the metal plate, the supporting posts cooperating with the metal plate to form an intermediate product; preparing a second mold that defines therein a second mold cavity and that has second upper and second lower mold halves which have second upper and second lower inner walls defining the second mold cavity; placing the intermediate product in the second mold cavity such that the supporting posts abut against the second upper and second lower inner walls and such that the metal plate partitions the second mold cavity into upper and lower mold sub-cavities; and introducing a second resin into the upper and lower mold sub-cavities to form a molded part that is bonded to and that cooperates with the supporting posts to form the molded plastic layer which encloses the metal plate.

BRIEF DESCRIPTION OF THE DRAWING

In the following drawings which illustrate an embodiment of the invention.

DETAILED DESCRIPTION OF THE PREFERRED EMBODIMENT

Figure 1:
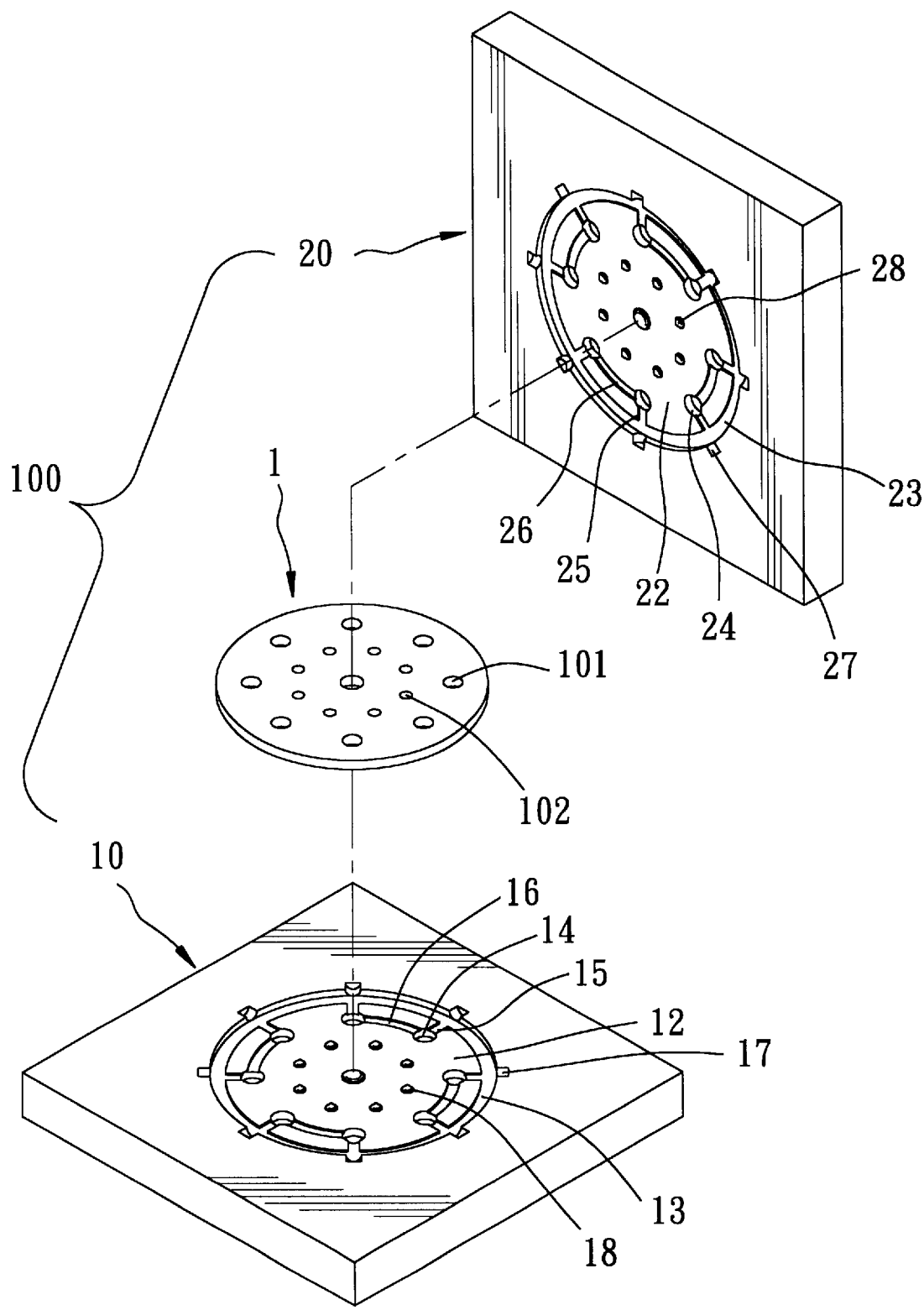
FIG. 1 is an exploded perspective view to illustrate configurations of a first mold and a metal plate which are to be employed in a process embodying this invention.
Figure 2:
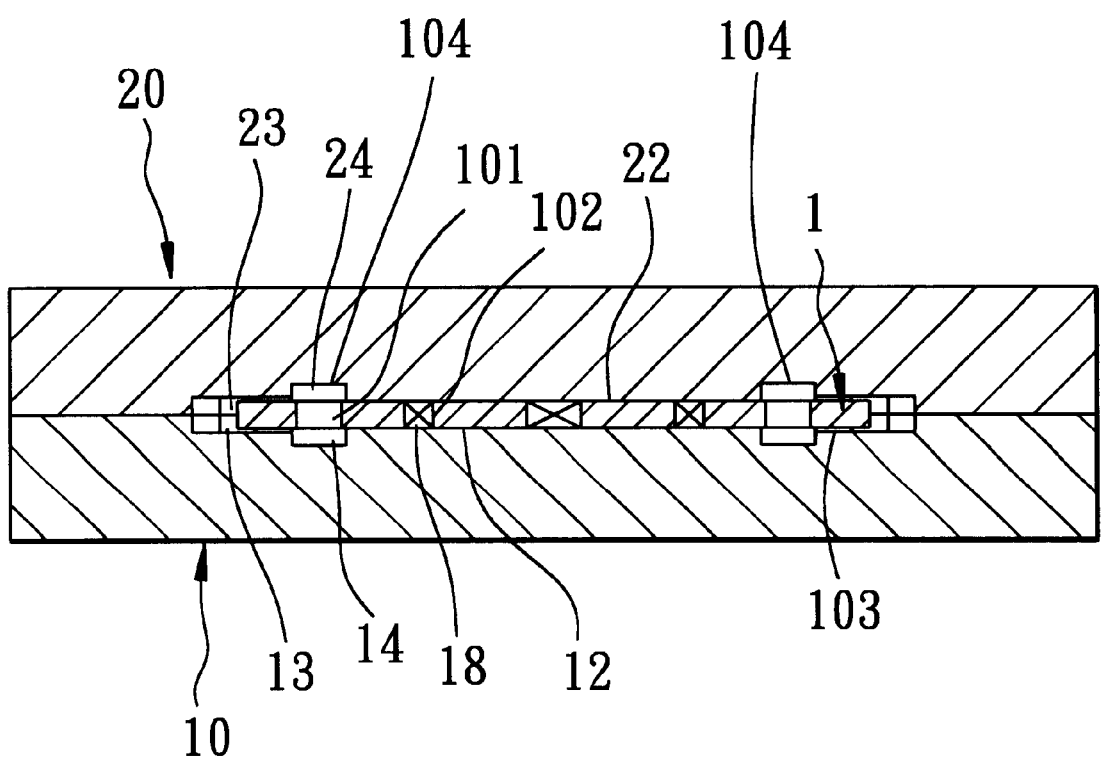
FIG. 2 is a cross-sectional side view to illustrate a step of placing the metal plate in the first mold according to the process embodying this invention.
Figure 3:
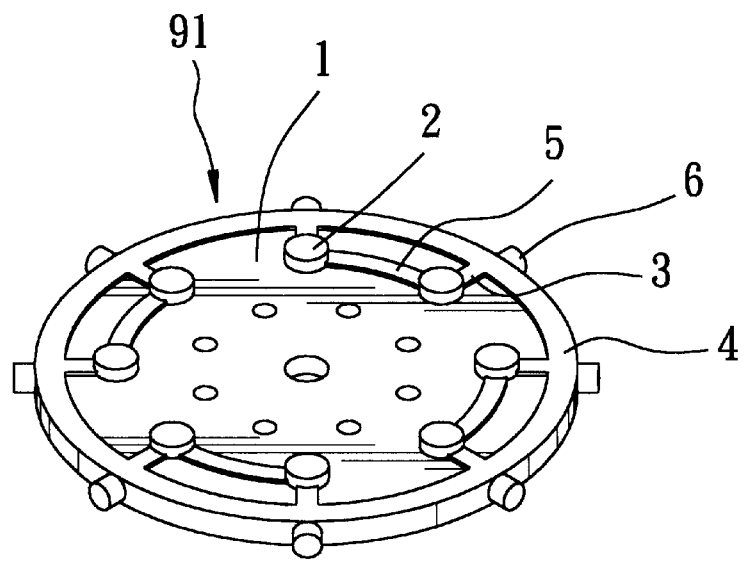
FIG. 3 is a perspective view to illustrate an intermediate product that has a plurality of supporting posts formed on the metal plate according to the process embodying this invention.
Figure 4:
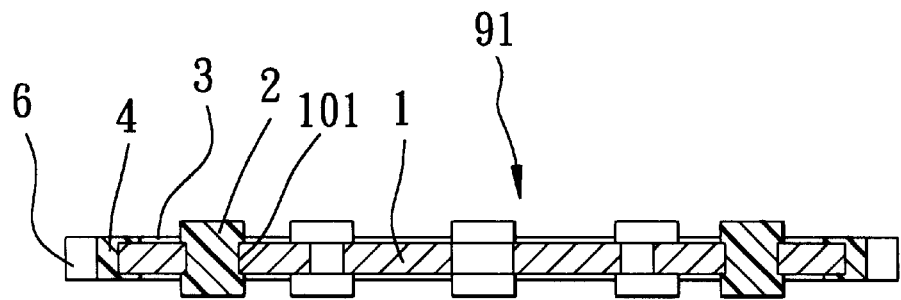
FIG. 4 is a cross-sectional side view of the intermediate product of FIG. 3.
Figure 5:
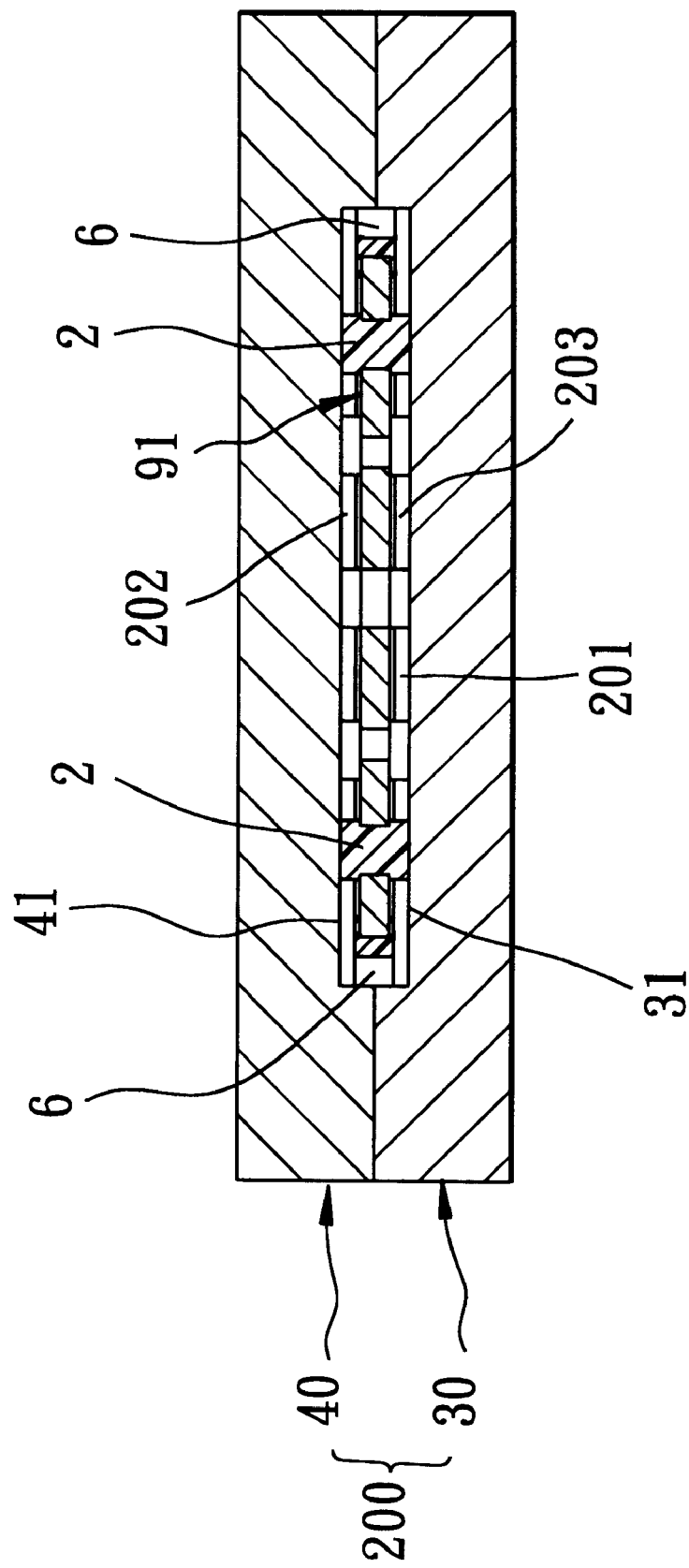
FIG. 5 is a cross-sectional side view to illustrate a step of placing the intermediate product in a second mold according to the process embodying this invention.
Figure 6:
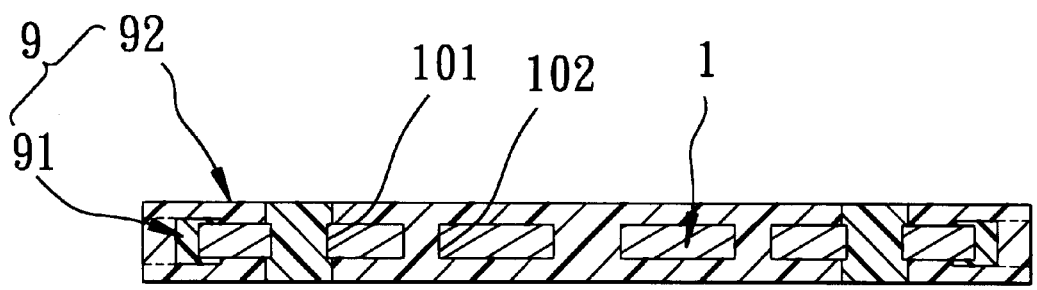
FIG. 6 is a cross-sectional side view of a molded plastic layer formed on the metal plate according to the process embodying this invention.

FIGS. 1 and 6 illustrate consecutive steps for forming a molded plastic layer 9 on a circular metal plate 1 according to the process of this invention.

The process includes the steps of: preparing a first mold 100 that confines therein a first mold cavity 103 and that has first upper and first lower mold halves 20, 10 which have first upper and first lower inner walls 22, 12 defining the first mold cavity 103, the first upper and first lower inner walls 22, 12 being formed with a plurality of pairs of complementary upper and lower post forming grooves 24, 14 that are angularly spaced apart, a plurality of pairs of complementary upper and lower positioning protrusions 28, 18 that are angularly spaced apart and that project into the first mold cavity 103, a pair of complementary upper and lower looped grooves 23, 13 that surround the upper and lower post forming grooves 24, 14, a plurality of pairs of complementary upper and lower arcuate grooves 26, 16, each of which interconnects two adjacent ones of the upper and lower post forming grooves 24, 14, a plurality of pairs of complementary upper and lower linking grooves 25, 15, each of which is connected to and in fluid communication with a respective one of the upper and lower post forming grooves 24, 14 and a respective one of the upper and lower looped grooves 23, 13, and a plurality of pairs of complementary upper and lower bulge forming grooves 27, 17 that project outwardly from the upper and lower looped grooves 23, 13, the upper and lower post forming grooves 24, 14 having cross-sections greater than those of the post forming holes 101; forming a plurality of post forming holes 101 and a plurality of positioning holes 102 in the metal plate 1; placing the metal plate 1 in the first mold cavity 103 such that each pair of the complementary upper and lower positioning protrusions 28, 18 extend into a respective one of the positioning holes 102 and such that each pair of the complementary upper and lower post forming grooves 24, 14 are vertically registered with and cooperate with a respective one of the post forming holes 101 to define a post forming cavity 104; introducing a first resin into the post forming cavities 104 to form a plurality of supporting posts 2 that respectively extend through the post forming holes 101 and that are bonded to the metal plate 1, a plurality of arcuate arms 5, each of which interconnects two adjacent ones of the posts 5, a ring 4 that encloses a peripheral edge of the circular plate 1, a plurality of linkages, each of which interconnects a respective one of the posts 2 and the ring 4, and a plurality of angularly spaced apart bulges 6 that protrude outwardly of the metal plate 1 from the ring 4, the pair of the upper and lower looped grooves 23, 13 cooperating with the pairs of the linking grooves 25, 15 to provide passages for the first resin to be introduced into the post forming cavities 104, the supporting posts 2 cooperating with the ring 4, the linkages 3, the arcuate arms 5, the bulges 6, and the metal plate 1 to form an intermediate product 91; preparing a second mold 200 that defines therein a second mold cavity 201 and that has second upper and second lower mold halves 40, 20 which have second upper and second lower inner walls 41, 31 defining the second mold cavity 201; placing the intermediate product 91 in the second mold cavity 201 such that the supporting posts 2 abut against horizontal portions of the second upper and second lower inner walls 41, 31, such that the bulges 6 abut against vertical portions of the second upper and second lower inner walls 41, 31, and such that the metal plate 1 partitions the second mold cavity 201 into upper and lower mold sub-cavities 202, 203; and introducing a second resin, which is compatible with the first resin, into the upper and lower mold sub-cavities 202, 202 to form a molded part 92 that is bonded to and that cooperates with the supporting posts 2, the ring 4, the linkages 3, the arcuate arms 5, and the bulges 6 to form the molded plastic layer 9 that encloses the metal plate 1.

Figure 7:
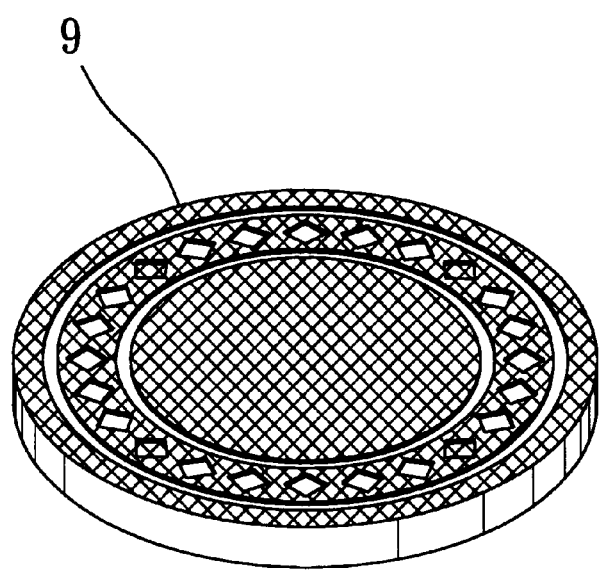
FIG. 7 is a perspective view of the molded plastic layer with an embossed pattern formed thereon according to the process embodying this invention.

The first and second resins are preferably the same material. As illustrated in FIG. 7, at least one of the second upper and second lower inner walls 41, 31 can be formed with a pattern of recesses (not shown) so as to form an embossed pattern on the molded plastic layer 9.

Figure 8:
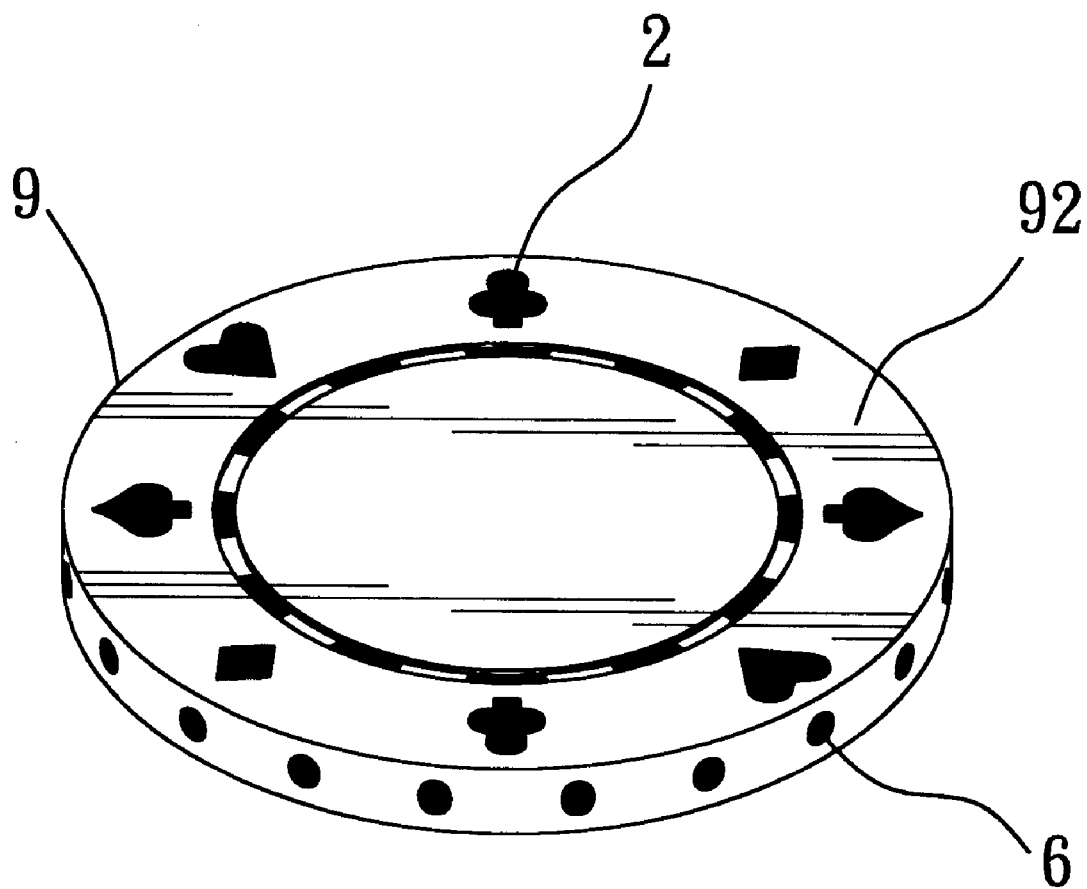
FIG. 8 is a perspective view of the molded plastic layer with another embossed pattern formed thereon according to the process embodying this invention.

FIG. 8 illustrates another pattern formed on the molded plastic layer 9, in which, the first and second resins have different colors, and the posts 2 have different designs for the purpose of enhancing aesthetic appeal.

With the design of the posts 2 and with the use of two molding stages having the same material for the first and second resins, the drawbacks associated with the prior art can be eliminated.

With the invention thus explained, it is apparent that various modifications and variations can be made without departing from the spirit of the present invention. It is therefore intended that the invention be limited only as recited in the appended claims.

I claim:

1. A process for forming a molded plastic layer on a metal plate, the process comprising the steps of:

preparing a first mold that confines therein a first mold cavity and that has first upper and first lower mold halves which have first upper and first lower inner walls defining said first mold cavity, said first upper and first lower inner walls being formed with a plurality of pairs of complementary upper and lower post forming grooves and a plurality of pairs of complementary upper and lower positioning protrusions that project into said first mold cavity;

forming a plurality of post forming holes and a plurality of positioning holes in the metal plate;

placing said metal plate in said first mold cavity such that each pair of said complementary upper and lower positioning protrusions extend into a respective one of said positioning holes and such that each pair of said complementary upper and lower post forming grooves are vertically registered with and cooperate with a respective one of said post forming holes to define a post forming cavity;

introducing a first resin into said post forming cavities to form a plurality of supporting posts that respectively extend through said post forming holes and that are bonded to the metal plate, said supporting posts cooperating with the metal plate to form an intermediate product;

preparing a second mold that defines therein a second mold cavity and that has second upper and second lower mold halves which have second upper and second lower inner walls defining said second mold cavity;

placing said intermediate product in said second mold cavity such that said supporting posts abut against said second upper and second lower inner walls and such that the metal plate partitions said second mold cavity into upper and lower mold sub-cavities; and introducing a second resin into said upper and lower mold sub-cavities to form a molded part that is bonded to and that cooperates with said supporting posts to form the molded plastic layer which encloses the metal plate.

2. The process of claim 1, wherein said first and second resins are the same material.

3. The process of claim 1, wherein said first and second resins have different colors.

4. The process of claim 1, wherein at least one of said second upper and second lower inner walls is formed with a pattern of recesses so as to form an embossed pattern on said molded plastic layer.

5. The process of claim 1, wherein said first upper and first lower inner walls are further formed with a pair of opposite upper and lower looped grooves that surround the metal plate, and a plurality of pairs of opposite upper and lower linking grooves, each of which is connected to and is in fluid communication with a respective one of said upper and lower post forming grooves and a respective one of said upper and lower looped grooves, said pair of said upper and lower looped grooves cooperating with said pairs of said linking grooves to provide passages for said first resin to be introduced into said post forming cavities.

* * * * *